(12) United States Patent
Strait

(10) Patent No.: US 6,536,316 B2
(45) Date of Patent: Mar. 25, 2003

(54) PIPE BEVELING AND FACING TOOL

(75) Inventor: David S. Strait, Lyle, WA (US)

(73) Assignee: Climax Portable Machine Tools, Inc., Newberg, OR (US)

( * ) Notice: Subject to any disclaimer, the term of this patent is extended or adjusted under 35 U.S.C. 154(b) by 55 days.

(21) Appl. No.: 09/727,367

(22) Filed: Nov. 29, 2000

(65) Prior Publication Data

US 2001/0029817 A1 Oct. 18, 2001

Related U.S. Application Data

(60) Provisional application No. 60/167,956, filed on Nov. 29, 1999.

(51) Int. Cl.[7] .................................................. B23B 3/22
(52) U.S. Cl. .......................................... 82/113; 82/128
(58) Field of Search ............................ 82/46, 117, 128, 82/131, 168, 154, 158, 159, 161; 403/348, 349; 242/571–577.4; 279/2.01–2.24

(56) References Cited

U.S. PATENT DOCUMENTS

| | | | | |
|---|---|---|---|---|
| 3,635,299 A | * | 1/1972 | Hayes ................... 173/DIG. 2 |
| 4,437,366 A | * | 3/1984 | Astle ........................... 82/113 |
| 4,784,028 A | * | 11/1988 | Sandford ..................... 82/128 |
| 5,063,799 A | * | 11/1991 | Brewer ........................ 82/158 |
| 5,133,565 A | * | 7/1992 | Schmidt .................... 279/2.04 |
| 5,217,175 A | * | 6/1993 | Stitz et al. ............... 242/571.8 |
| 5,531,550 A | * | 7/1996 | Moruzzi ...................... 408/82 |
| 5,731,556 A | * | 3/1998 | Gardner et al. ............. 181/230 |
| 6,202,522 B1 | * | 3/2001 | Tremblay .................... 82/113 |
| 6,234,666 B1 | * | 5/2001 | Kolb ........................... 366/279 |

* cited by examiner

*Primary Examiner*—A. L. Wellington
*Assistant Examiner*—Brian Walsh
(74) *Attorney, Agent, or Firm*—Dellett and Walters

(57) ABSTRACT

A pipe beveling tool with improved operation and structure with reduced chatter due to its anti-backlash design. This tool allows for quick changing of cutter heads and tool bits. It also incorporates a quieter pneumatic motor muffler system and has a reduced overall length due to a double action feed system.

11 Claims, 9 Drawing Sheets

PIPE BEVELING AND FACING TOOL

CROSS REFERENCE TO RELATED APPLICATIONS

This application claims priority from U.S. provisional patent application No. 60/167,956, filed Nov. 29, 1999.

BACKGROUND OF THE INVENTION

This invention relates to machine tools and more particularly to an improved pipe beveling tool.

Larger diameter pipes are often machined by a pipe beveling and facing tool to provide a surface suitable for welding pipe fittings or other pipe thereto. Such pipe beveling tools generally have a pipe attachment unit, a drive unit, a feed unit and a cutting unit.

The pipe attachment unit typically is a mandrel that has at one of its ends a chuck with expandable jaws. A draw bolt is provided such that when the draw bolt is rotated, the jaws of the mandrel chuck radially expand uniformly from the chuck body, thereby frictionally engaging the inner walls of the pipe to be machined. This frictional engagement provides a strong, stable attachment such that the mandrel is oriented along the longitudinal axis of the pipe to be beveled. On the mandrel is supported a drive unit, a feed unit, and a cutting unit of a pipe beveling tool.

The drive unit is non-rotatable and is slideably mounted on the mandrel. The drive unit rotates a cutting unit which holds cutting bits capable of performing such machining procedures as "facing", "beveling" or "radiusing" the pipe. The drive unit and cutting unit are advanced axially along the mandrel toward the pipe by a feed unit which connects the drive unit to the mandrel. In operation, a reactionary force (counter torque) is transmitted to the drive and feed units as the rotating cutting unit performs machining operations on the pipe. The drive and feed units however, do not rotate because they are locked to the mandrel which is held from moving relative to the pipe by the mandrel chuck.

A common area of difficulty with conventional pipe beveling and facing machines is that to change cutter heads or cutter tool bits, the pipe attachment unit must be removed from the inside of the pipe. This is time consuming and can lead to a loss of alignment upon reinstallation.

Another problem with prior art devices in this field is that they do not render a smoothly machined surface. This is a result of "chatter" or non-uniform application of pressure by the tool bit upon the pipe such that the bit will "bounce" and cause an irregular cutting of the pipe surface. This "chatter" is caused primarily by backlash and mandrel flex.

Since the mandrel acts as the support for the drive unit, feed unit and cutting unit, all forces generated during the machining operation are transmitted to the mandrel. Therefore the mandrel must be strong enough to maintain sufficient axial rigidity to minimize mandrel flex under cutting conditions. This mandrel flex is partially caused by the combined mass of the feed, drive and cutting units. The longer the distance between the mandrel attachment point and the center of mass of the combined feed, drive and cutting units, the stronger the mandrel must be to provide adequate support. Prior art devices tend to either use a mandrel that is not of sufficient strength, or to position the center of mass of the combined various units of the tool too far from the mandrel attachment point.

Mandrel flex is also partially a problem related to the strength of the holding force that the mandrel chuck exerts on the interior of the pipe. If this holding force is not strong enough to hold the mandrel rigid, when cutting occurs, the forces exerted back upon the mandrel will cause the mandrel chuck to move slightly, resulting in chatter and a reduction in the smoothness of the machined surface. Many of the conventional mandrel chucks do not develop sufficient holding force or there is no method of manipulating the mandrel chuck to develop sufficient holding force.

Another source of chatter in the prior art is from backlash that occurs at the interface between the pipe attachment unit and the drive unit. In high torque situations, such as beveling and facing operations, backlash or relative movement during engagement between the components of the tool is highly undesirable as it causes "chatter". This backlash between various components relative to one another, also accelerates wear, thus, backlash is a self-propagating phenomena. Backlash is a common problem in the prior art because of the way in which the mandrel connects to the rest of the tool. Traditionally, mechanical keys are used to frictionally lock the mandrel and the rest of the tool from moving relative to each other. Conventional keys in the mechanical industry are of a single piece design and not adjustable. To accommodate a friction fit installation, these keys must be designed with somewhat relaxed tolerances so there is inherently a small degree of backlash present wherever mechanical keys are used. Most of the locking keys in the prior art do not compensate for wear, requiring frequent replacement. This conventional design for mating of the mandrel to the rest of the tool thus results in "chatter" and also a greater potential for key failure from the high shear stresses resulting from the counter rotational forces.

In order to obtain a sufficiently strong attachment between the mandrel chuck and the pipe, conventional pipe beveling machines have used an elongated chuck design with long jaws that provide a linear frictional engagement with the pipe inner wall. This design limits the use of the pipe beveling tool to situations where sufficient depth exists in the pipe to accommodate this elongated head. Such a design is especially disadvantageous when the machining operation must take place close to a "TEE" or elbow in the pipe where there may not be sufficient depth to engage the mandrel chuck in the pipe.

Another problem with such prior art tooling devices is their size and weight. Many of these devices are configured with a large percentage of the weight of the device such a distance away from the surface to be machined that the mandrels and chucks must be made thicker and stronger to support the weight. Since these tools are usually operated by a solo operator, weight is important. In an attempt to reduce overall weight, the prior art beveling tools commonly used pneumatic motors which causes another problem, since while pneumatic motors provide the capability for variable speed, high RPMs and high torque, they have the downfall of generating noise from the spinning motor as well as from the pneumatic exhaust. This can be annoying to the operator running pipe machining tools in confined spaces where the noise is intensified and can be damaging to the operator's hearing.

SUMMARY OF THE INVENTION

In accordance with the invention, an improved pipe facing and beveling tool is provided that has a shorter and lighter pipe attachment unit, minimal backlash, a method for changing cutter heads without removing the pipe attachment unit from the inside of the pipe, and a reduced level of operating noise.

Accordingly, it is an object of the present invention to provide an improved pipe beveling tool possessing greater rigidity to minimize mandrel flex during operation.

It is a further object of the present invention to provide an improved compact, lightweight pipe beveling and facing tool that provides a smoothly machined surface, accommodates component wear, and operates with a minimum of chatter.

It is another object of the present invention to provide an improved pipe beveling tool which allows for a maximum of infeed while maintaining a center of mass that is relatively close to the pipe to retain mandrel rigidity.

It is a further object of the present invention to provide an improved design for securing a drive unit to a mandrel so as to minimize backlash and to adjustably compensate for wear of the components.

It is yet a further object to provide an improved compact pipe beveling and facing tool that operates with a reduced level of frictional noise generated from the spinning motor as well as from the pneumatic exhaust encountered during motor operation.

It is another object of the present invention to provide an improved pipe beveling and facing tool with an enhanced method for increasing the frictional engagement of the mandrel chuck head to the inside of the pipe.

It is still another object of the present invention to provide an improved tool with a shorter mandrel chuck capable of providing strong enough frictional attachment to be used with a minimum of pipe depth such as encountered at pipe elbows.

It is further another object of the present invention to provide an improved mandrel chuck that can be used at pipe elbow locations.

It is a still further object of the present invention to provide an improved tool that is more compact, lighter, and has a shorter mandrel than conventional pipe beveling tools.

It is another object of the present invention to provide an improved tool with the ability to change cutter heads or cutter tool bits without removing the mandrel chuck from the pipe.

It is yet another object of the present invention to provide an improved quieter muffler system that encloses and quiets the motor portion of a tool as well as the exhaust.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The pipe beveling apparatus according to a preferred embodiment of the present invention comprises a pipe attachment unit, a feed unit, a drive unit, and a cutting unit.

Figure 1:
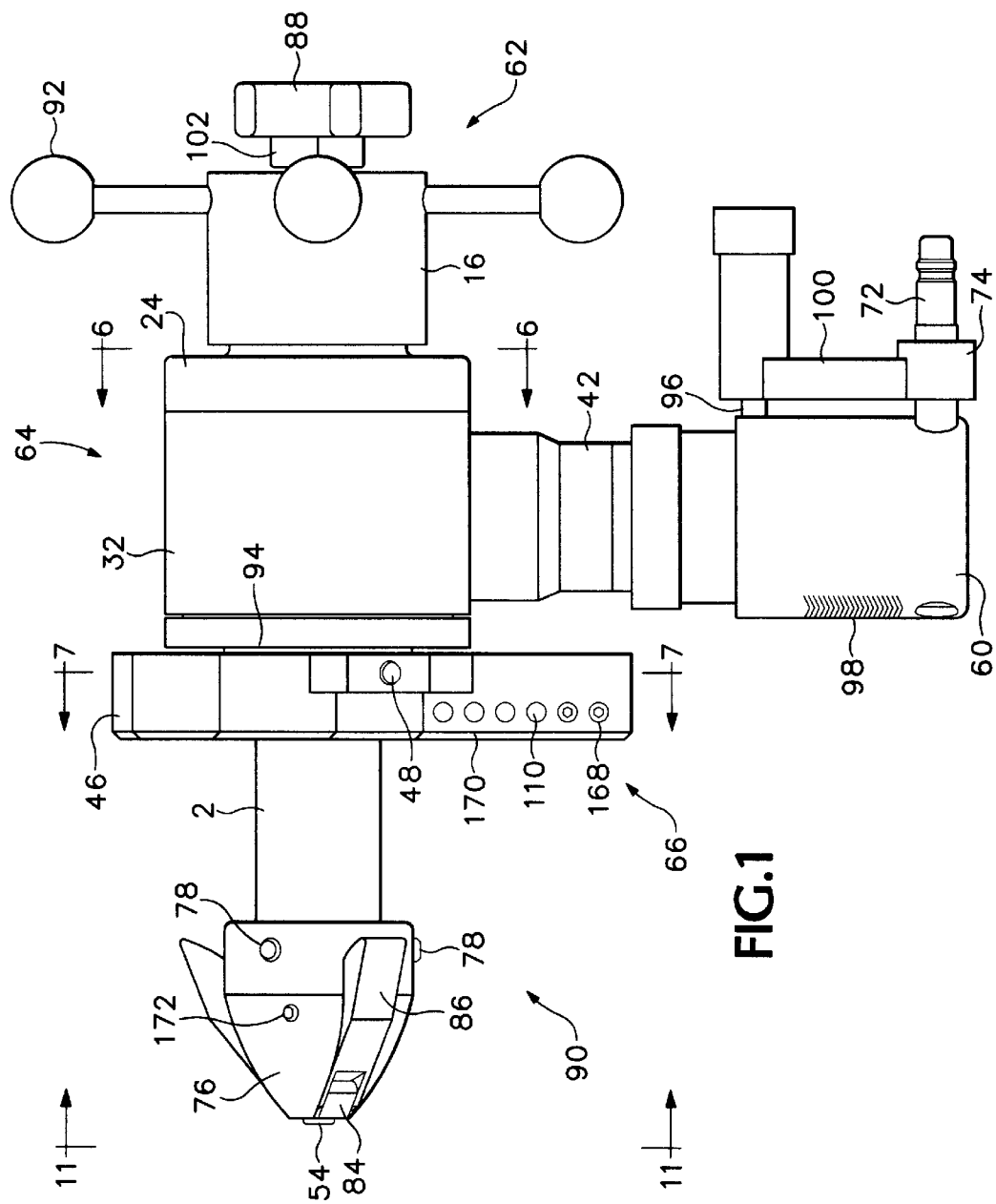
FIG. 1 is a side view of the pipe beveling and facing tool according to the present invention.

Referring to FIG. 1, a side view of the pipe beveling and facing tool, the general arrangement of the pipe attachment unit, the feed unit, the drive unit and the cutting unit can be seen. The pipe attachment unit 90 is located at the front end of the tool. A drawbolt 54 protrudes from the frustoconical shaped end of an elbow chuck 76. An actuator 84 contacts jaws 86 and is threadably engaged on the drawbolt 54. Elbow chuck bayonet pins 78 connect the elbow chuck 76 to a mandrel 2 thereby forming the pipe attachment unit 90. A threaded orifice 172 extends radially into elbow chuck 76.

The feed unit 62 is threadably attached to the mandrel 2 of pipe attachment unit 90. A mandrel knob 88 has a stepped down inner knob 102 that resides at the rear of feed unit 62 and is connected to drawbolt 54. Feed handles 92 extend from a nut barrel 16 normal to the longitudinal axis of feed unit 62. Feed unit 62 is attached to a drive outer housing 32 of the drive unit 64 by a torque plate 24.

Drive unit 64 comprises a pneumatic motor 42 connected to the drive outer housing 32 and a spindle main drive 94. A cylindrical muffler 60 partially envelops pneumatic motor 42 and receives a rotatable cylindrical air throttle valve 74 normal to the longitudinal axis of pneumatic motor 42 and 180 degrees from exhaust air vents 98. An adjustment arm 100 extends normally from air throttle valve 74 and is secured to muffler 60 by a lock pin 96. An air fitting 72 is formed about the outer periphery of air throttle valve 74.

The cutting unit 66 includes a "Y" shaped cutting head 46 with three radially extending cutting arms 170. Cutting head 46 is attached to the spindle main drive 94 by bayonet pins 48. Plural set screws 168 threadably engage corresponding threaded orifices 110 which are bored into the arms and which lie on lines extending radially along the longitudinal axis of the cutting arms 170.

Figure 2:
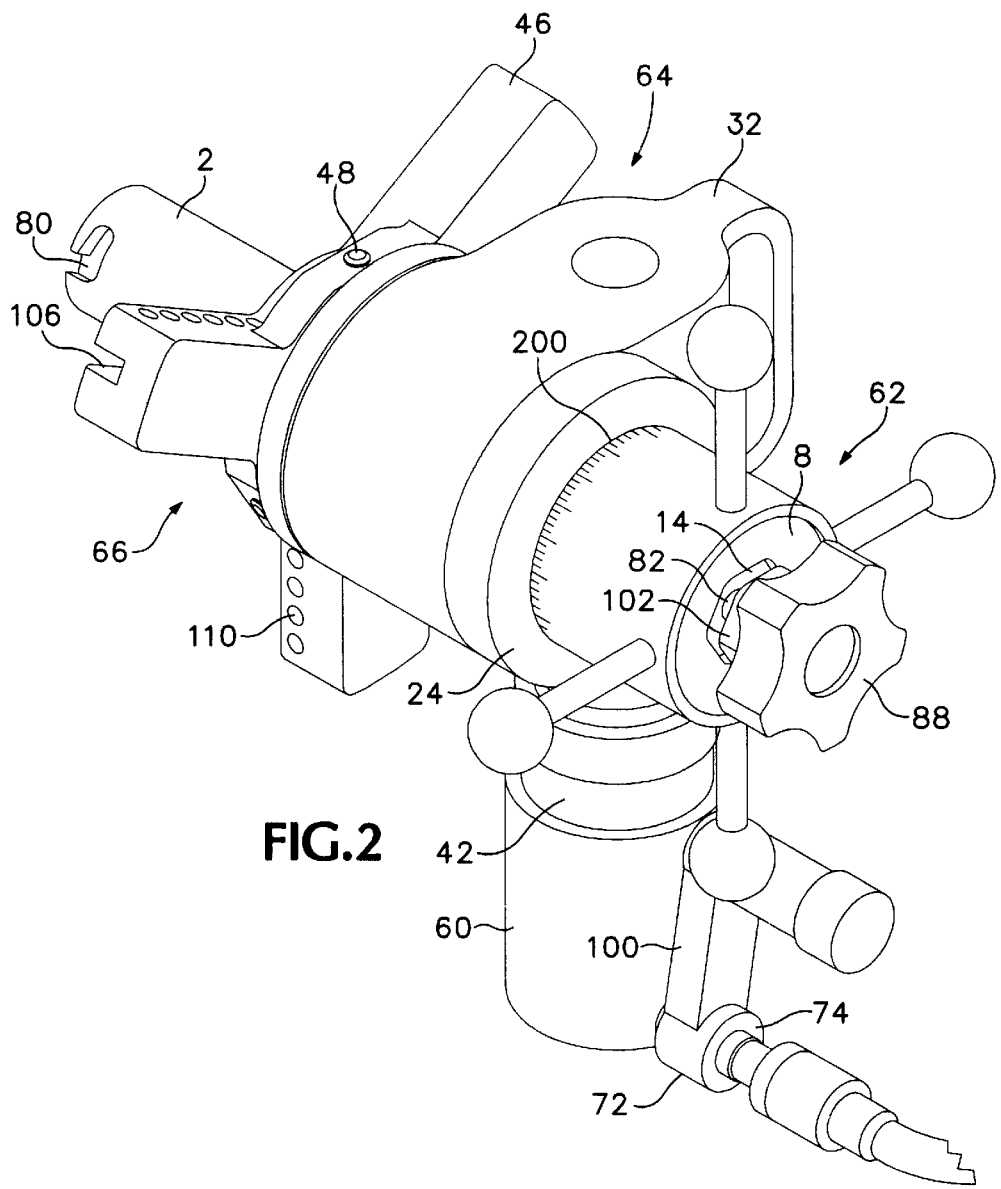
FIG. 2 is a perspective view of the pipe beveling and facing tool with the chuck head removed.

FIG. 2, a perspective view of the pipe beveling and facing tool, shows the tool with the chuck removed. Mandrel 2 has a bayonet recess 80 formed on the periphery. The feed unit 62 has a hexagonal knob recess 14 formed in a core nut 8 adjacent to an inner knob 102, wherein the inner knob has a profile that mates with the hexagonal knob recess 14. Inner knob 102 is attached to a drawbolt extension 82. Each arm 170 of cutting head 46 includes a tool bit slot 106 formed along the longitudinal axis of the arm. The tool bit slots are intersected normally by the threaded orifices 110.

Figure 3:
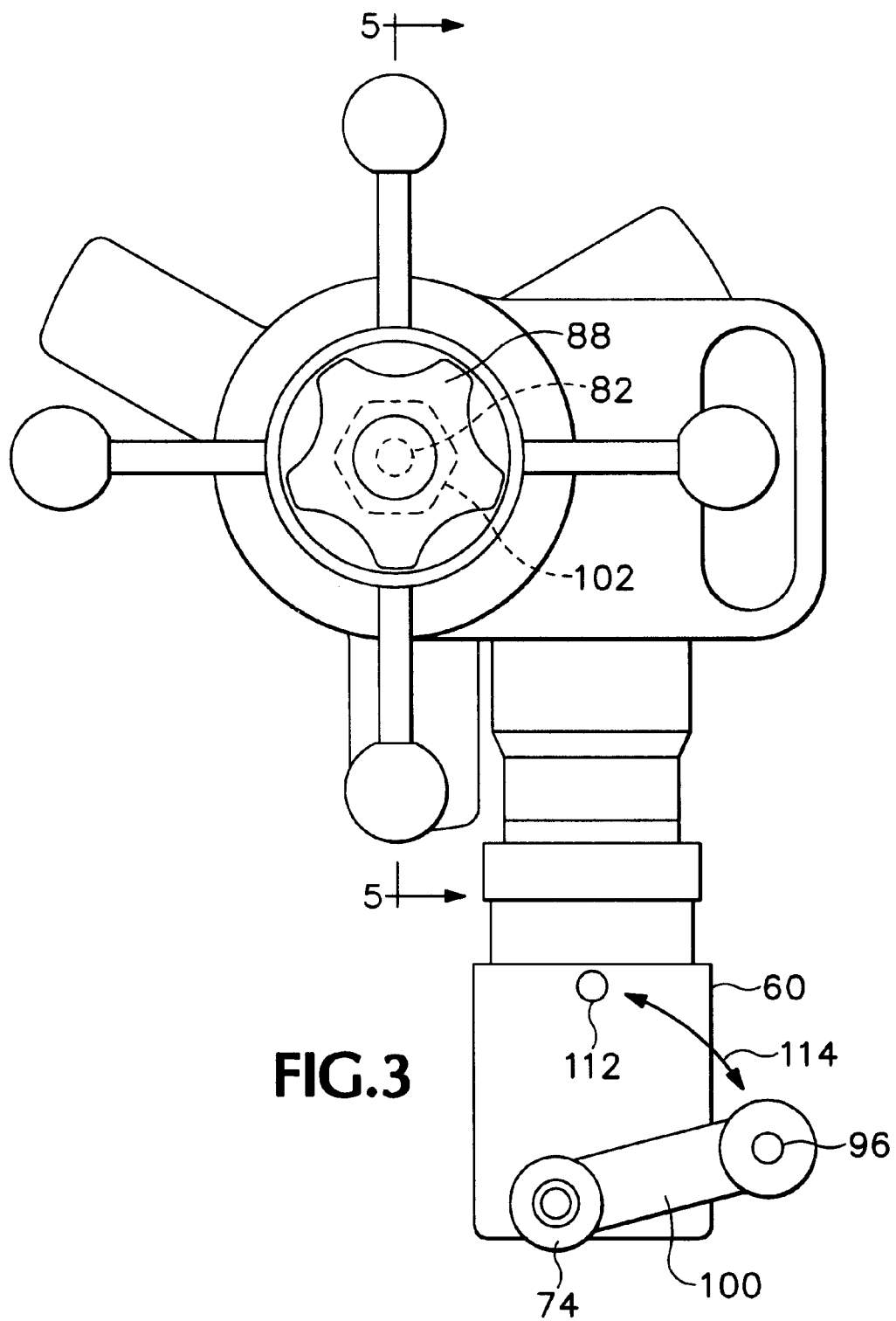
FIG. 3 is an end view of the pipe beveling and facing tool.

Referring now to FIG. 3, an end view of the pipe beveling and facing tool, it may be observed that the adjustment arm 100 can be moved along the direction illustrated by arrow 114. It may also be observed that locking pin 96 suitably can be engaged with a locking recess 112 formed in muffler 60.

Figure 4:
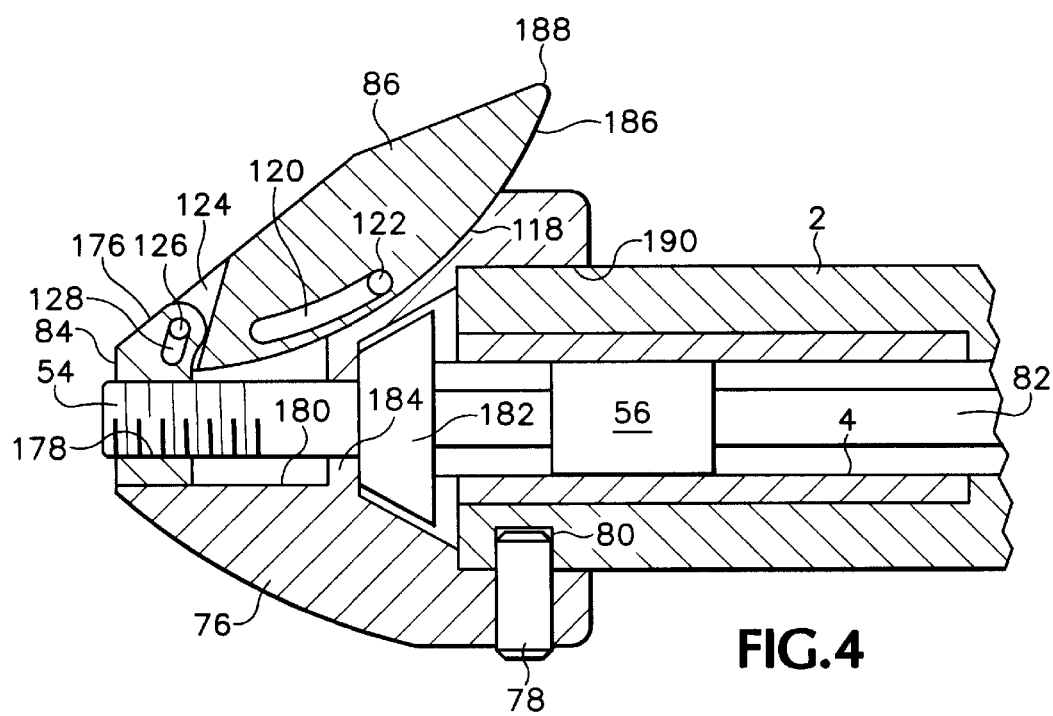
FIG. 4 is a cross sectional view of an elbow chuck.

Referring now to FIG. 4, a cross sectional view of the elbow chuck 76, mandrel 2 has an interior bore 4 defined therein and a socket sleeve 56 connects the drawbolt 54 to a drawbolt extension 82. Drawbolt 54 threadably engages with the actuator 84. Elbow chuck 76 is suitably fabricated from a metal or alloyed metal and has a forward frustoconical profile with three ramp grooves 118 having concave bottoms, said ramp grooves being oriented along the longitudinal axis of the chuck body. Each ramp groove 118 houses a crescent shaped jaw 86 with an arcuate, stopped, elongated slot 120 running axially along the inner side of jaw 86. Set screws 122 protrude inwardly through the body of elbow chuck 76 into the side of each ramp groove 118, oriented perpendicularly to the longitudinal axis of ramp groove 118 and into elongated slots 120 so as to retain jaw 86 in groove 118 yet allow jaw 86 to slidingly move along the axis of ramp groove 118. A chuck bayonet pin 78 extends into the bayonet recess 80 of mandrel 2.

At the top of each jaw 86 is an actuator slot 124, and on both sides of a selected actuator slot 124, actuator holes (not illustrated) are bored therethrough. Actuator 84 is suitably a "Y-shaped" piece having three arms 176, spaced equidistantly radially, which have slotted orifices 128 defined therein. Each arm 176 engages into actuator slot 124 of jaw 86. Pins 126 pass through the slotted orifices 128 terminating in the actuator holes, thereby connecting the actuator arms 176 to the jaw 86 and retaining the actuator in actuator slots (or grooves) 124 yet allowing for slight movement of the actuator arms 176.

Figure 5:
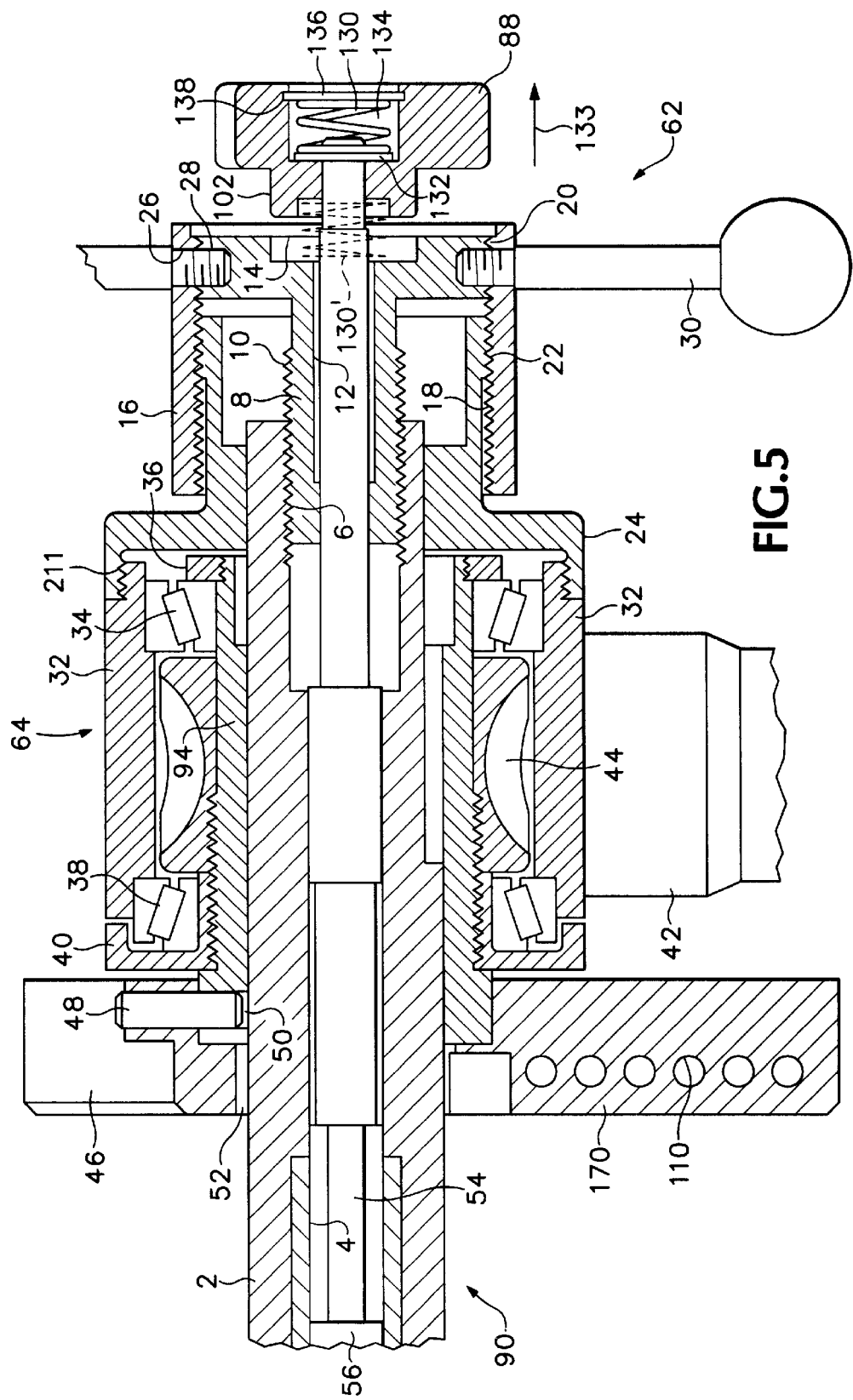
FIG. 5 is a cross sectional view of the tool taken through line 5—5 of FIG. 3.

Referring to FIG. 5, a cross sectional view of the pipe beveling and facing tool taken through line 5—5 of FIG. 3, the internal connections of feed unit 62, drive unit 64 and pipe attachment unit 90 may be observed. As noted herein, the mandrel 2 of pipe attachment unit 90 contains the longitudinal bore 4, which carries an internal mandrel right hand thread 6. A T-shaped, stepped cylindrical nut core 8 contains a bore 12 and the hexagonal knob recess 14. Nut core 8 has an external right hand thread 10 on its smaller diameter end and an external left hand thread 20 on its larger diameter end. The right hand thread 10 on the smaller diameter end of nut core 8 is threadably engaged with the internal right hand thread 6 of mandrel 2. The external left hand thread 20 of the larger diameter end of nut core 8 is threadably engaged with an internal left hand thread 18 of the nut barrel 16. Nut core 8 carries the hexagonal knob recess 14 in the planar face of its larger diameter end.

Nut barrel 16 is a hollow cylinder, open at both ends with the internal left hand thread 18, three tapped orifices 26 spaced 120 degrees apart equidistantly thereabout, and external division markings 200 defined about the perimeter. Tapped orifices 28 in the nut core align with nut barrel orifices 26 defining contiguous threaded orifices through which feed handles 30 are threadably engaged to positionally lock the nut barrel 16 and nut core 8 to each other. The internal left hand thread 18 threadably engages with the nut core external left hand thread 20 on nut core 8 and a left hand thread 22 of the torque plate 24.

The torque plate 24 is of a stepped flange configuration having the external left hand thread 22 on the smaller end and an internal thread 211 on the larger end. The internal thread engages with a corresponding thread on drive unit outer housing 32 to connect feed unit 62 to drive unit 64. Torque plate external left hand thread 22 is threadably engaged with nut barrel internal left hand thread 18, thereby connecting feed unit 62 and drive unit 64.

A rear beveled roller bearing 34 is located between the drive outer housing 32 and the spindle main drive 94. A retaining nut 36 threadably engages spindle main drive 94 and contacts bearing 34. A front beveled roller bearing 38 resides between a plate bearing backing 40 and drive outer housing 32. The plate bearing backing 40 threadably engages with the spindle main drive 94. The pneumatic motor 42 is affixed to the drive outer housing 32 and is linked to a worm gear 44, while the worm gear 44 is threadably engaged to the spindle main drive 94. The bayonet pin 48 located on the cutting head 46 is lodged into a bayonet recess 50 in spindle main drive 94. A plain bearing 52 is located between the mandrel 2 and the cutting head 46. The drawbolt extension shaft 54 mates with socket sleeve 56 and extends through the mandrel bore 4, nut core bore 12, the hexagonal knob recess 14 and the inner knob 102, and is held in the mandrel knob 88 by a clip 132. A spring 130 resides in a mandrel knob recess 134 that is defined centrally at the outer face of the knob, between clip 132 and an end clip 136. The end clip 136 is contained in a slot 138 defined about the inner periphery of the knob recess 134, adjacent the outer knob face. Alternatively, in place of spring 130, a spring 130' (illustrated in phantom in FIG. 5) may be placed between knob 102 and knob recess 14, to bias the knob outwardly in the direction of arrow 133.

Figure 6:
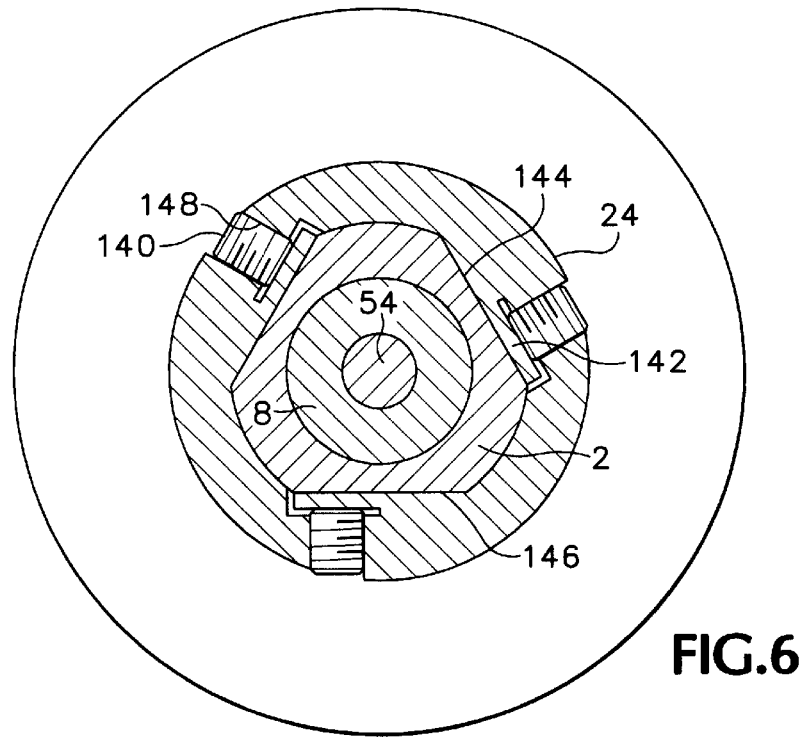
FIG. 6 is a cross sectional view of the pipe beveling and facing tool taken through line 6—6 of FIG. 1.

Referring to FIG. 6, a cross sectional view of the pipe beveling and facing tool taken through line 6—6 of FIG. 1, the sliding mechanism of feed unit 62 is illustrated. The torque plate 24 contacts the outer surface of mandrel 2. The outer periphery of a portion of mandrel 2 has three flat gibs 144 positioned radially 120 degrees apart that align with flats 146 defined on the torque plate 24. The torque plate has gib screws 140 threadably engaged with stopped orifices 148 that are normal to flats 146 at each of three flexible gib tabs 142. The nut core 8 is threadably engaged with mandrel 2 and the drawbolt extension 82 passes through the nut core orifice 12.

Figure 7:
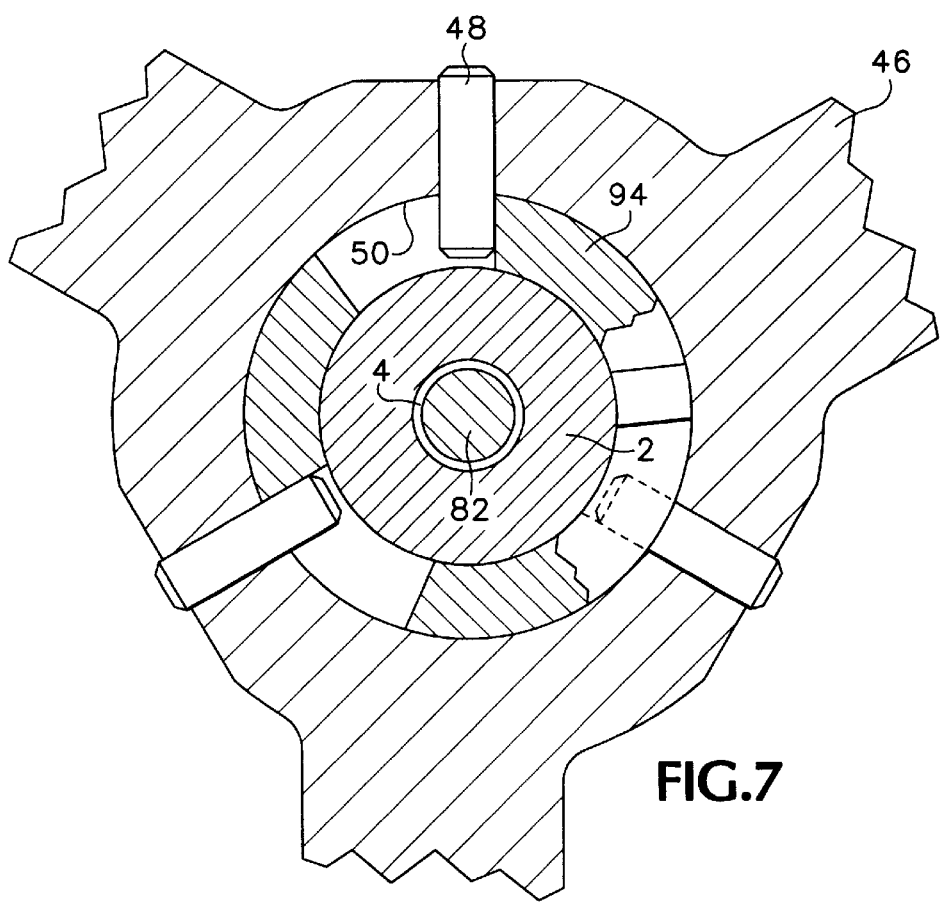
FIG. 7 is a cross sectional view of the pipe beveling and facing tool taken through line 7—7 of FIG. 1.

With reference to FIG. 7, a cross sectional view of the pipe beveling and facing tool taken through line 7—7 of FIG. 1, the connection between the cutting unit and the drive unit is illustrated. The cutting head 46 carries the three bayonet pins 48 that matingly engage in respective spindle main drive bayonet slots 50. Mandrel 2 passes coaxially through the spindle main drive 94 and the drawbolt extension 82 passes through the mandrel bore 4.

Figure 8:
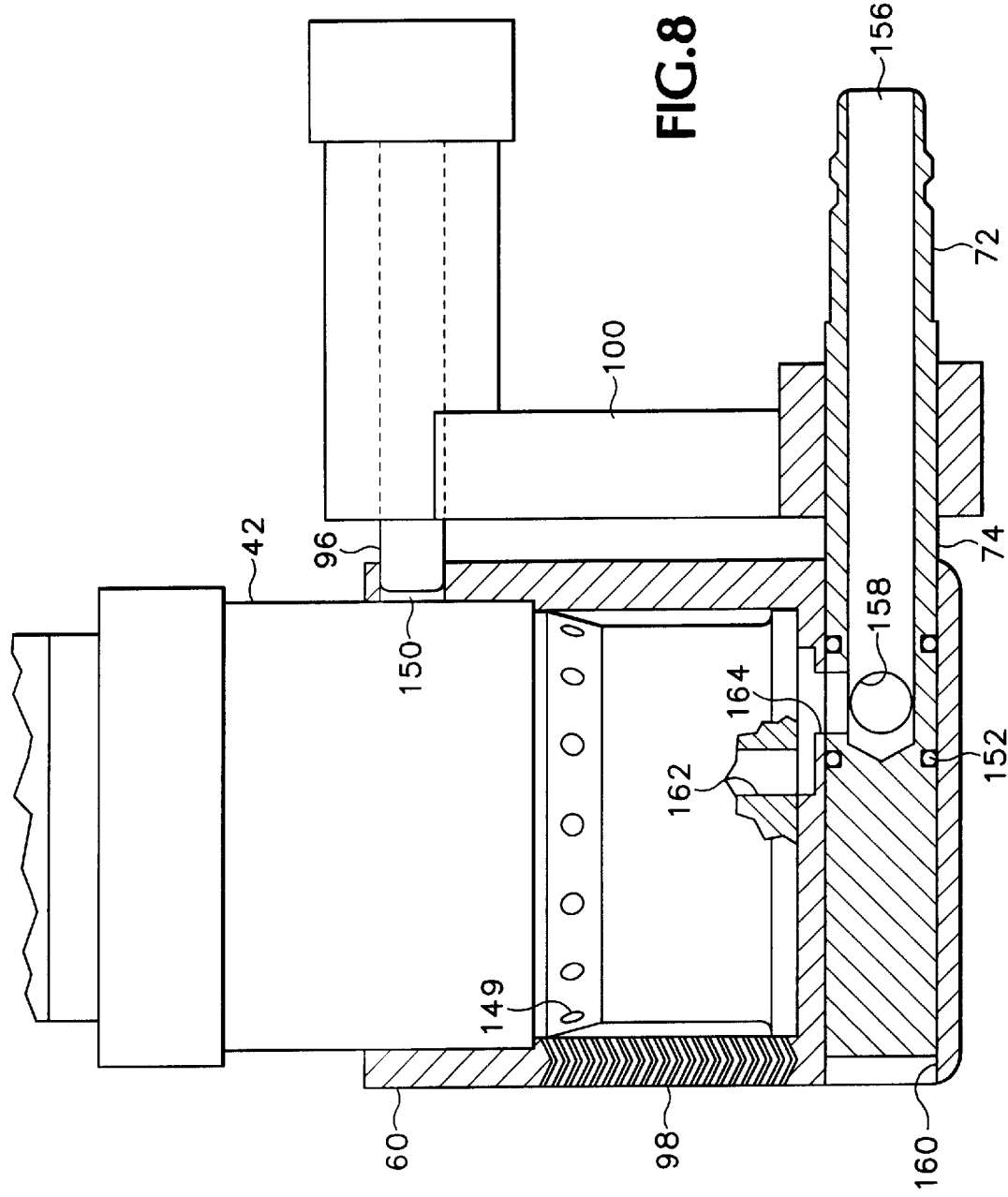
FIG. 8 is a partial cross sectional view of the muffler and pneumatic motor of the pipe beveling tool.

Referring now to FIG. 8, a partial cross sectional view of muffler 60 and pneumatic motor 42, the design of the air throttle valve 74 is illustrated. Muffler 60 encapsulates the top end of the pneumatic motor 42. The cylindrically shaped air throttle valve 74 has a stopped air inlet passage 156 bored centrally along its longitudinal axis, which intersects a perpendicular air outlet orifice 158 (shown projecting outwardly of the drawing). The throttle valve rotationally mounts into a muffler bore 160 so that the air outlet orifice 158 can align with an air passage 164. O-rings 152 are located on either side of the air outlet orifice 158. The air passage 164 aligns with a motor air inlet 162. The adjustment arm 100 extends normally from throttle valve 74 and contains a lock pin 96, which resides in a detent 150 in the body of muffler 60. The muffler exhaust air vents 98 align with motor exhaust air holes 149. The outer surface of throttle valve 74 is formed into the air fitting 72.

Figure 11:
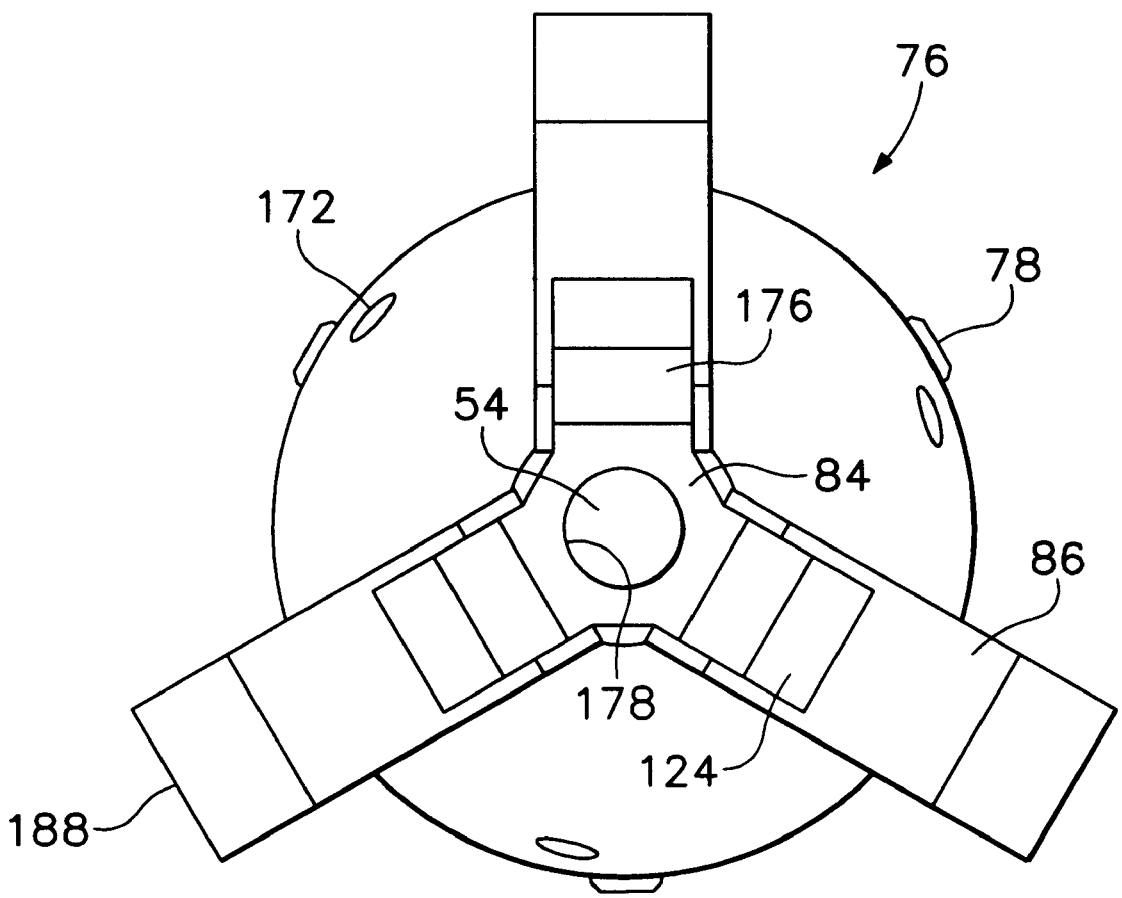
FIG. 11 is a front end view of the elbow chuck of pipe beveling and facing tool taken through line 11—11 of FIG. 1.

Next referring to FIG. 11, a front end view of the elbow chuck taken through line 11—11 of FIG. 1, the relationship between the drawbolt, the actuator and the radially expanding jaws is shown. Drawbolt 54 passes through the axial center of the elbow chuck 76 and threadably engages a hole 178, which is centrally located in actuator 84. The three radially equidistant actuator arms 176 are pinned in actuator slots 124 (not visible in FIG. 11, but illustrated in FIG. 4) of jaws 86. Jaws 86 are housed within three radially equidistant ramp grooves 118 (visible in FIG. 4), in the body of elbow chuck 76 and set screws 122 (illustrated in FIG. 4) are threaded into orifices 172 so as to retain the jaws 86 in groove 118 yet allow the jaws to perform sliding movement along the axes of the ramp grooves 118.

Referring again to FIG. 1, in operation, the pipe attachment unit 90 allows for the rigid and self centering support of the entire pipe beveling apparatus coaxially with the workpiece pipe. Feed unit 62 is fixedly secured to the rear of pipe attachment unit 90 and slidingly advances the drive unit 64 along the longitudinal axis of pipe attachment unit 90. The front of drive unit 64 rotates about the longitudinal axis of pipe attachment unit 90 and is attached to the cutting unit 66. Accordingly, cutting unit 66 is rotated and advanced into the pipe edge to be machined.

Referring to FIG. 1, FIG. 4 and FIG. 11 together, the basic components of pipe attachment unit 90 are mandrel 2, elbow chuck 76 and the drawbolt 54. The elbow chuck 76, as discussed hereinbelow, is inserted into the interior of a pipe and expanded to frictionally engage the pipe at three points equidistant radially about the pipe's inner wall. The elbow chuck is adapted for use where there is a pipe elbow in close proximity to the surface to be beveled. The elbow chuck 76 connects to the mandrel 2 and maintains the mandrel rigidly centered and coaxial with respect to the pipe.

A drawbolt mechanism extends from the back of the tool to the front of chuck 76. This mechanism is fashioned by connecting drawbolt 54 to drawbolt extension 82 with socket sleeve 56. The mechanism passes through mandrel bore 4 and through a drawbolt recess 180, which runs through the axial center of the elbow chuck 76. The actuator 84 includes a centrally located threaded hole 178 that threadably engages to the correspondingly threaded end of drawbolt 54. Since each of the three actuator arms 176 are pinned in actuator slots 124 within jaws 86 (which are maintained within ramp grooves 118), the actuator 84 is not free to rotate and thus moves along the longitudinal axis of the drawbolt 54 within elbow chuck 76 when drawbolt 54 is rotated. This action of the actuator 84 along the drawbolt causes the sliding of the jaws 86 along the ramp grooves 118. Set screws 122 retain jaws 86 in groove 118 yet allow jaw 86 sliding movement along the longitudinal axis of ramp groove 118. Jaws 86 are crescent shaped with a radiused back profile 186 and a linear leading edge 188 such that as each jaw 86 traverses rearwardly along its respective ramp groove 118, the leading edge 188 moves perpendicularly away from the longitudinal axis of elbow chuck 76. This causes frictional engagement at three points between the leading edges 188 and the inside wall of the pipe, thereby self centering the elbow chuck 76 and pipe attachment unit 90 relative to the pipe. The three jaws 86 of elbow chuck 76 as described above, frictionally affix pipe attachment unit 90 by expanding radially outwardly inside a pipe upon rotation of drawbolt 54. The rigidity of the mandrel 2 and the gripping strength of pipe attachment unit 90 is related to the amount of torque that can be exerted onto drawbolt 54 to expand jaws 86.

If drawbolt 54 is rotated counter clockwise the reverse of the above process is accomplished and jaws 86 slidingly retract up ramp grooves 118 and disengage from the pipe. The actuator 84 is prevented from being threaded off the end of drawbolt 54 by the contact of a stop collar 182 against an abutment 184 in the body of chuck 76.

The back end of chuck 76 contains a recess 190 to accommodate mandrel 2, wherein three dowel pins 78 protrude normally and inwardly from the inside perimeter of the recess 190. The dowel pins are located approximately 120 degrees apart radially and fit into the mating bayonet recess 80 (visible in FIG. 2) located on the exterior surface of the front end of mandrel 2. The recesses 80 are of the "bayonet fitting" style, and as such, have a two-leg 90 degree "L" configuration, with the "L" residing in a clockwise direction. This enables the mating parts to be slid and then twisted together. There is a slight taper on the second leg of the "L" so as to draw the chuck 76 into closer proximity with mandrel 2 when twisting, thereby eliminating gaps. Since the cutting unit 66 spins in a clockwise direction, this connection is kept in tight engagement by the counter rotational forces exerted onto mandrel 2 by the cutting unit.

Referring now to FIG. 2, FIG. 5 and FIG. 6 together, the "anti backlash" design, and the method the feed unit advances the drive unit along the mandrel can be seen, as well as the method of final tightening used to frictionally engage the chuck with the pipe. As mentioned before, mandrel 2 is a bored cylindrical shaft with three exterior gibs 144 spaced 120 degrees apart radially, and extending partially along the length. The front end of mandrel 2 has external bayonet recess 80 to connect to chuck 76 and the rear end includes internal mandrel right hand thread 6. The mandrel passes through openings in cutting head 46 of the cutting unit 66, the spindle main drive 94 of drive unit 64, and the torque plate 24 of feed unit 62. The mandrel supports the mass of the rest of the tool on the plain bearing 52 of cutting unit 66 and on the flats 146 of the torque plate, which is threadably mounted at the rear of the drive outer housing 32. The torque plate has three threaded stopped orifices 148 spaced radially 120 degrees apart so as to house gib screws 140 perpendicularly to flats 146 and perpendicularly to the corresponding mandrel gibs 144. Threading the gib screws 140 into orifices 148 until the gib screws engage the flexible gib tabs 142 causes the gib tabs to deflect towards gibs 144, increasing the surface contact between torque plate 24 and mandrel 2. This contact removes any rotational "free play" or "backlash" between mandrel 2 and the torque plate, yet allows for the sliding movement of the torque plate along the mandrel, to the extent of the axial length of gibs 144.

This "anti backlash" design utilizing gibs 144 serves a number of functions. First, it anchors the position of the drive unit 64, feed unit 62 and cutting unit 66 with respect to the pipe and prevents these units from counter rotating as a reaction to the torque developed during the pipe machining operation. Second, the gibs 144 and flats 146 comprise areas of broad surface contact thereby distributing the load forces to minimize the amount of wear between surfaces and minimize any resultant "backlash". Third, gibs 144 act to eliminate "chatter" of cutting unit 66 because a close tolerance fit is achieved between the gibs and the flats preventing their relative movement. Fourth, the gibs 144 and flats 146 eliminate the use of keys between mandrel 2 and feed unit 62, thus removing the potential for key failure commonly encountered in the prior art as a result of the concentrated stress forces placed on keys.

Advancement of the drive unit 64 and cutting unit 66 along mandrel 2 by feed unit 62 involves primarily interplay between the mandrel, the nut core 8, the nut barrel 16 and the torque plate 24. Inward or outward advancement of the cutting unit along the longitudinal axis of the mandrel 2 via the feed unit is accomplished by rotating the nut barrel the desired number of external divisions 200 about the axis of the mandrel 2. This moves the drive unit 64, the feed unit 62 and the cutting unit 66 forwardly or backwardly along the longitudinal axis of the mandrel in two simultaneous ways.

First, rotating the nut barrel 16 clockwise pushes the torque plate away from the nut barrel left hand thread 18

(which is locked to the mandrel 2) thus advancing the pipe beveling tool down the mandrel towards the pipe. Second, because the nut core 8 is locked relative to the nut barrel 16 and rotates with nut barrel 16, the nut core external right hand thread 10 pulls nut core 8 into the mandrel internal right hand thread 6 and further causes the pipe beveling tool to slidingly move down the mandrel gibs 144. Since mandrel 2 and torque plate 24 are not locked together as to sliding movement, but rather are engaged to prevent counter rotation from the torque generated at cutting unit 66, the torque plate flexible gib tabs 142 can axially slide along the mandrel gibs 144. Thus, drive unit 64, feed unit 62, and cutting unit 66 are advanced along the longitudinal axis of the mandrel by two separate mechanisms. This system of feed results in more linear feed movement (approximately twice as much) for a given length of pipe beveling and facing tool. For example, the cutting bit may be advanced 2 inches towards the pipe with only 1 inch of feed unit movement along the mandrel. This allows for a shorter, lighter tool, which in turn results in an increased rigidity to the overall tool, thereby minimizing chatter.

External division markings 200 which are defined about the circumference of nut barrel 16 indicate the relative feed position of cutting head 46 onto the pipe.

Figure 9:
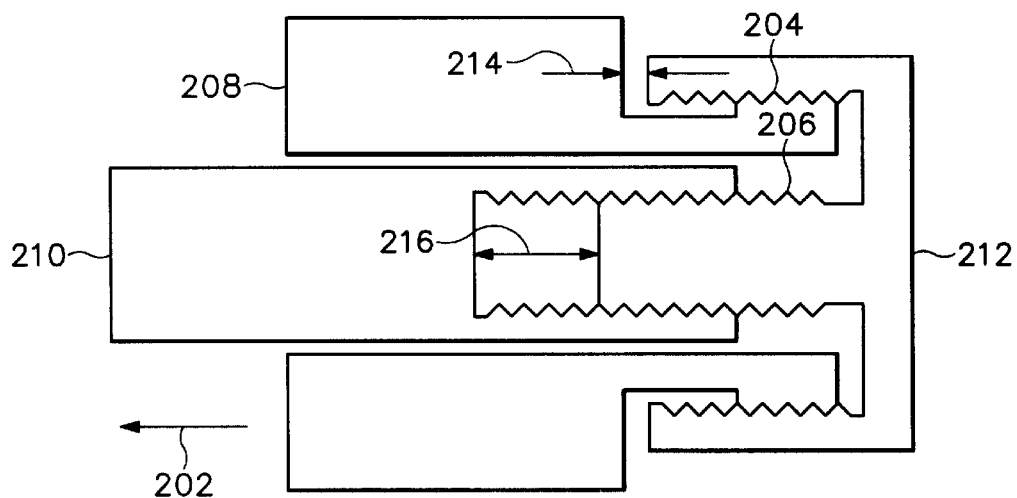
FIG. 9 is a representative drawing of the feed unit prior to advancement of the drive unit and cutting unit along the mandrel.
Figure 10:
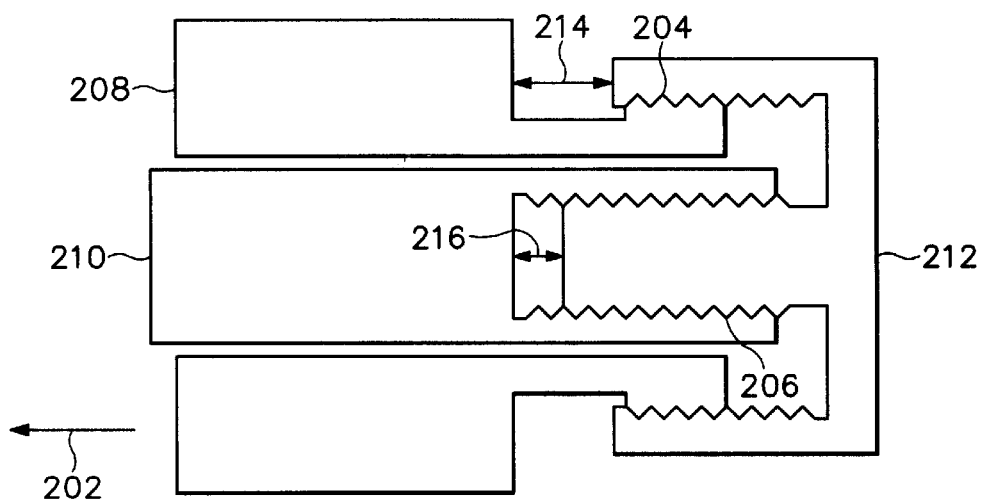
FIG. 10 is a representative drawing of the feed unit after the advancement of the drive unit and cutting unit along the mandrel.

FIG. 9 is a representative drawing of the feed unit 62 prior to advancement of the drive unit 64 and the cutting unit 66 along the mandrel 2, and FIG. 10 is a representative drawing of the feed unit after the advancement of the drive unit and the cutting unit along the mandrel. FIG. 9 and FIG. 10 representatively illustrate how a combination of left hand threads and right hand threads can enhance feed movement. First thread 204 is a left hand thread (LHT) and second thread 206 is a right hand thread (RHT). When a first part 212 (which corresponds to a mated nut core 8 and nut barrel 16), is rotated in a clockwise direction, a second part 208 (which corresponds to torque plate 24), loosens from the first part 212 by virtue of LHT 204. This widens gap 214 and advances the second part 208 in the direction of arrow 202. Simultaneously with this advancement, the clockwise rotation of the first part 212 also draws the first part into a third part 210 (which corresponds to mandrel 2), by virtue of RHT 206. This shortens gap 216 and again advances second part 208 (since it is connected to first part 212) in the direction of arrow 202. This movement of part 208 in the direction indicated by arrow 202 along part 210 mimics the movement of drive unit 64 along mandrel 2.

Again referring to FIG. 2, FIG. 5 and FIG. 6 together, the method of final tightening used to frictionally engage chuck 76 with the pipe employs the drawbolt mechanism, which is made up of three pieces: drawbolt 54, drawbolt extension 82, and a hexagonal socket sleeve 56. The drawbolt 54 has an externally threaded front end with a hexagonal back end, while drawbolt extension 82 has an externally threaded back end with a hexagonal front end. The hexagonal end of the drawbolt extension and the hexagonal end of the drawbolt matingly slide into opposite ends of the hexagonal socket sleeve 56. This manner of connection allows the drawbolt extension 82 to rotate the drawbolt 54 and also allows chuck 76 to remain in the pipe upon removal of the rest of the tool when bayonet pins 78 are disengaged from the bayonet recesses 80, to facilitate changing of cutting head 46 changes or tool bit changes.

The drawbolt extension 82 passes through mandrel bore 4 and nut core bore 12 and has the spring loaded mandrel knob 88 affixed to the end of extension 82. The mandrel knob may be independently rotated without affecting the position of nut core 8 or mandrel 2. Rotating the mandrel knob in a clockwise manner will cause drawbolt 54 to rotate and will advance chuck jaws 86 radially outwardly from the body of elbow chuck 76 and into engagement with the interior wall of the pipe. Because the radius of mandrel knob 88 is relatively small, rotating mandrel knob 88 by hand does not generate much torque to advance chuck jaws 86 radially outwardly. Therefore, when the spring 130 of the mandrel knob is depressed, the back profile of inner knob 102 engages the corresponding hexagonal recess 14 in the planar face of nut core 8. This engagement locks rotation of the drawbolt 54 to the rotation of the nut core 8 and nut barrel 16. Rotating the feed handles 30 clockwise while in this configuration, will cause the advancement of the feed unit 62, the drive unit 64 and the cutting unit 66 as discussed above, but more importantly, this engagement will allow a rotational mechanical advantage from use of the feed handles to be applied to drawbolt 54, whereby the chuck jaws 86 can be expanded radially further outwardly from the perimeter of the chuck 76, increasing the strength of the attachment of the tool to the pipe. The rigidity of the mandrel 2 and the gripping strength of the pipe attachment unit 90 are related to the amount of torque that can be exerted onto the drawbolt 54 to expand jaws 86.

Referring to FIG. 3 and FIG. 8 together, the operation of the drive unit 64 and air throttle valve 74 is illustrated. The drive unit is rotated by a conventional pneumatic motor 42 that is partially encapsulated within the cylindrical muffler 60. The motor speed is regulated by air throttle valve 74. The formation of male air fitting 72 about the outer periphery of the air throttle valve enables connection to a standard commercial female air fitting through which air is supplied to the pneumatic motor. Since the cylindrical body of the air throttle valve is rotationally mounted in the muffler bore 160, pivoting of adjustment arm 100 about the longitudinal axis of the throttle valve alters the position of air exit orifice 158 within the muffler bore relative to air passage 164 and motor air inlet 162. The adjustment arm 100 extends normally from the throttle valve so as to allow the precise rotation of the air throttle valve in the muffler bore. Lock pin 96 extends into detent 150 when the air throttle valve is in the closed position. The rotation of air throttle valve 74 within muffler bore 160 variably adjusts air flow to the pneumatic motor 42. In the closed position, the air outlet orifice 158 is sealed off by close contact with the side of muffler bore 160 and air is sealed from escaping by O-rings 152 on either side of air exit orifice 164. In the fully open position, air outlet orifice 158 aligns with air exit orifice 164 which is open to the cavity of the pneumatic motor 42 so as to allow the inlet air to blow directly down onto the blades of the motor, thus spinning the motor and exiting out of motor exhaust air holes 148. The exiting air then exhausts out of the muffler exhaust air vents 98. In this configuration, the muffler 60 silences both the exhausting air noise and the frictional noise of motor 42.

Again referring to FIG. 5, the rotation of the cutting unit 66 by the drive unit 64 is described. The outer casing of the pneumatic motor is connected to the drive outer housing 32, and air which is admitted to pneumatic motor 42 turns a set of worm gears 44 which are threadably engaged with the exterior surface of the spindle main drive 94. The worm gears 44 are disposed so that the axis of the spindle main drive is normal to the axis of the incoming air. The tapered roller bearings 34 and 38 are positioned between spindle main drive 94 and outer drive housing 32 so as to allow rotation of the spindle main drive and cutting unit 66 relative to other components of the tool. The drive unit 64 and feed unit 62 do not rotate themselves, being held by connection to mandrel 2 through torque plate 24. The feed unit and drive unit slide axially along mandrel 2 to feed the cutting head 46 into the pipe.

The back of outer drive housing 32 has threaded edge that accommodates the correspondingly threaded internal thread 211 of torque plate 24. Bearing 34 slides onto the rear of the spindle main drive 94 and is held between the spindle main drive and drive outer housing 32 by the retaining nut 36 that is threadably engaged onto the main drive. The main drive 94 protrudes through the front of the outer drive housing 32. Plate bearing backing 40 threads onto the front of the spindle main drive and has an exterior profile to accommodate pressed-on tapered roller bearing 38 between the plate bearing backing and the outer drive housing. Thus, the plate bearing backing 40 and roller bearing 38 also act as a dust shield at the front of the drive outer housing 32. The two bearings maintain axial alignment of the spindle main drive with the outer drive housing as well as with mandrel 2, and allow for the rotation of the drive 94.

Referring to FIG. 2 and FIG. 7, the manner by which the spindle main drive 94 and cutting head 46 mate together will be explained. The spindle main drive has three "L" shaped bayonet slots 50, disposed 120 degrees apart radially from one another, that clockwise correspondingly mate with the three bayonet pins 48 that protrude from the cutting head 46, providing a bayonet fitting operates in a corresponding manner to the bayonet fitting employed between mandrel 2 and chuck 76, except that it locks by a counterclockwise rotation of cutting head 46. This connection feature accompanied with the bayonet fitting between chuck 76 and mandrel 2 allows the tool to be removed while leaving chuck 76 in the pipe, facilitating quick changing of cutting heads or tool bits, while still enabling the tool to be easily reattached to the pipe or workpiece in its original position.

Cutting head 46 has three tool bit holder arms 170 extending radially and equidistantly from the center. The arms 170 each have a longitudinal centered tool bit slot 106 that is perpendicularly intersected by orifices 110. The cutting bit is frictionally held along tool bit slot 106 by set screws 168, which are threadably engaged into orifices 110. Various cutting bits may be held in the cutting head at the same time to accomplish multiple cutting tasks. For example, with three cutting bits the pipe could be externally beveled, internally relieved and faced at the same time.

Although this embodiment uses elbow chuck 76 for shallow pipe situations, an alternative chuck may be used where the depth that the chuck can be inserted into the pipe is not of concern. The principle of operation of the alternative chuck corresponds to that of elbow chuck 76 in that a rotating drawbolt forces an actuator to slide three beveled jaws along beveled ramp slots and outwardly from the circumference of the chuck to frictionally engage the inner wall of a pipe. The alternative chuck differs from elbow chuck 76 in the design shape of the jaws and the ramp slots. In this alternative chuck, the jaws are of a rectangular configuration so that the chuck jaws frictionally engage the inner wall of the pipe at three lines of contact rather than at three points of contact. Operation of the pipe beveling apparatus is similar regardless of which of these chucks is employed.

Another embodiment of the pipe beveling and facing tool uses cutter heads of various configurations that hold a tool bit in different ways to accomplish different types of cuts. An alternate way to face a pipe is available through the use of a facing plate. This type of cutter head connects to the pipe beveling tool in a manner corresponding to the connection of the elbow chuck, but differs in that it has a single cutter arm that advances radially from the tool on a two piece dovetailed slide system.

In another embodiment, cutter head 46 is advanced by the addition of additional push rod actuated rack and pinion feed system as disclosed in U.S. Pat. No. 5,678,464 issued Oct. 21, 1997, the disclosure of which is hereby incorporated by reference.

Thus, in accordance with the present invention, an improved pipe beveling and facing tool is provided, with enhanced operational characteristics and features.

While plural embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A portable pipe machining tool comprising:
   a pipe attachment unit;
   a drive unit;
   a feed unit; and
   a cutting unit,
   wherein said cutting unit attaches to the drive unit, and said drive unit attaches to the feed unit, and said feed unit fixedly mounts onto the pipe attachment unit, and said pipe attachment unit frictionally attaches to an inside surface of a pipe such that said feed unit advances said drive unit and said cutting unit along the longitudinal axis of—the pipe attachment unit,
   wherein said pipe attachment unit further comprises:
      a mandrel with a first end, a second end, a longitudinal bore and at least three mandrel gibs thereon; and
      a radially expandable chuck attached to the first end of said mandrel by a quick release mechanical coupling,
   wherein said feed unit comprises:
      a nut core;
      a nut barrel;
      a torque plate; and
      at least one feed handle,
   wherein said nut core is positionally locked to said nut barrel by said feed handle and is clockwise threadably engaged with the longitudinal bore of said mandrel, and said nut barrel is counter clockwise threadably engaged with said torque plate, and said torque plate is connected to said drive unit, such that clockwise rotation of said feed handle slidingly advances said drive unit and said cutting unit along the mandrel gibs by pulling the nut core into the longitudinal bore of the mandrel and simultaneously pushing the torque plate away from the nut barrel.

2. The portable pipe machining tool of claim 1 wherein said torque plate has an aperture corresponding to a cross sectional profile of said mandrel and at least one set screw that adjustably contacts a flexible gib tab so as to deflect said flexible gib tab to contact said mandrel gib.

3. A portable pipe machining tool comprising:
   a pipe attachment unit;
   a drive unit;
   a feed unit; and
   a cutting unit,
   wherein said cutting unit attaches to the drive unit, and said drive unit attaches to the feed unit, and said feed unit fixedly mounts onto the pipe attachment unit, and said pipe attachment unit frictionally attaches to an inside surface of a pipe such that said feed unit advances said drive unit and said cutting unit along the longitudinal axis of the pipe attachment unit, wherein said pipe attachment unit further comprises:
a mandrel with a first end, a second end, a longitudinal bore and at least one mandrel gib thereon; and
a radially expandable chuck attached to the first end of said mandrel by a quick release mechanical coupling, wherein said chuck comprises:
a frustoconical body with an axial bore therein and having at least three slotted crescent shaped ramps on an exterior surface thereof that are oriented parallel to the longitudinal axis of said frustoconical body;
a threaded drawbolt passing through said axial bore;
an actuator threadably engaged to said drawbolt; and
at least three crescent shaped jaws residing within said ramps and attached to said actuator,
wherein rotation of said drawbolt causes said actuator to move along the longitudinal axis of the frustoconical body and slidingly advance said jaws along said ramps such that said jaws expand radially from said frustoconical body,
further comprising a drawbolt extension that passes through the longitudinal bore of said mandrel and protrudes from a bore in said nut core, wherein said drawbolt has a socket recess defined therein that matingly engages with said drawbolt extension, wherein said drawbolt extension includes a knob attached to an end protruding from said bore in said nut core,
wherein said nut core has a recess defined therein that corresponds to said knob so as to enable said drawbolt to be rotationally locked with said nut core and said nut barrel when said knob is depressed into said recess, thereby enabling mechanical advantage to be rotationally applied to said drawbolt when said nut barrel is rotated.

4. A portable pipe machining tool comprising:
a pipe attachment unit;
a drive unit;
a feed unit; and
a cutting unit,
wherein said cutting unit attaches to the drive unit, and said drive unit attaches to the feed unit, and said feed unit fixedly mounts onto the pipe attachment unit, and said pipe attachment unit frictionally attaches to an inside surface of a pipe such that said feed unit advances said drive unit and said cutting unit along the longitudinal axis of the pipe attachment unit,
wherein said drive unit further comprises:
a pneumatic motor;
an air throttle valve; and
a muffler,
wherein said muffler encapsulates a portion of said pneumatic motor and said air throttle valve is rotationally mounted in said muffler.

5. The portable pipe machining tool of claim 4 wherein said air throttle valve has a longitudinal bore defined therein that transmits air to an air exit orifice in said muffler so as to direct air to said pneumatic motor.

6. The portable pipe machining tool of claim 4 wherein said portion of pneumatic motor includes an area where air exhausts.

7. The portable pipe machining tool of claim 5 wherein said longitudinal bore of the air throttle valve is stopped and said longitudinal bore is intersected by a partial cross bore such that said air throttle valve is adapted to be rotated to variably align said cross bore with said air exit orifice in said muffler.

8. A feed unit for a portable pipe machining tool comprising:
a nut core;
a nut barrel;
a torque plate; and
at least one feed handle,
wherein said nut core is positionally locked to said nut barrel by said feed handle and is clockwise threadably engaged with a longitudinal bore of a mandrel, and said nut barrel is counter clockwise threadably engaged with said torque plate, and said torque plate is connected to said drive unit, such that clockwise rotation of said feed handle slidingly advances said drive unit and said cutting unit along the mandrel by pulling the nut core into the longitudinal bore of the mandrel and simultaneously pushing the torque plate away from the nut barrel.

9. A drive unit for a machine tool, comprising:
a pneumatic motor;
an air throttle valve; and
a muffler,
wherein said muffler encapsulates a portion of said pneumatic motor and said air throttle valve is rotationally mounted in said muffler, said air throttle valve has a longitudinal bore defined therein that transmits air to an air exit orifice in said muffler so as to direct air to said pneumatic motor.

10. The drive unit of claim 9 wherein said portion of pneumatic motor includes an area where air exhausts.

11. The drive unit of claim 9 wherein said longitudinal bore of the air throttle valve is stopped and said longitudinal bore is intersected by a partial cross bore such that said air throttle valve is adapted to be rotated to variably align said cross bore with said air exit orifice in said muffler.

* * * * *